United States Patent [19]

Missout et al.

[11] Patent Number: 4,587,801
[45] Date of Patent: May 13, 1986

[54] SYSTEM FOR ROTATIONALLY SLAVING AN OPTICAL FIBER FEEDING AND DISPENSING DEVICE IN A CABLING LINE

[75] Inventors: Bernard M. Missout; Jean-Pierre Michaux; Jean-Luc Piova, all of Paris, France

[73] Assignees: Societe Anonyme de Telecommunications; Societe Industrielle de Liaisons Electriques, both of Paris, France

[21] Appl. No.: 739,060

[22] Filed: May 29, 1985

[30] Foreign Application Priority Data

May 30, 1984 [FR] France ................ 84 08532

[51] Int. Cl.⁴ .............. G02B 6/04; H01B 13/02
[52] U.S. Cl. ................................. 57/6; 57/9; 57/13; 57/264; 57/352
[58] Field of Search .......... 57/3, 6, 9, 13–15, 57/352, 264, 265, 19; 350/96.23

[56] References Cited

U.S. PATENT DOCUMENTS

| | | | |
|---|---|---|---|
| 4,195,468 | 4/1980 | King et al. | 57/9 |
| 4,309,864 | 1/1982 | Hulin | 57/6 |
| 4,384,446 | 5/1983 | Hope et al. | 57/6 |
| 4,411,130 | 10/1983 | Dubois et al. | 57/13 X |
| 4,497,164 | 2/1985 | Dotti et al. | 57/6 |

Primary Examiner—John Petrakes
Attorney, Agent, or Firm—Laubscher & Laubscher

[57] ABSTRACT

In an optical fiber cabling line where a ring having helical grooves is drawn at a constant translational speed by a main motor, there is provided a system for slaving a rotational speed of an optical fiber feeding and dispensing device driven by motor means to a number of ring groove pitches per second in order to compensate for groove pitch fluctuations resulting from the ring production process. The system comprises roller and cam means coupled to the ring and to the feeding and dispensing device for detecting a difference between the rotational speed and the number of pitches per second thereby converting the speed difference into a voltage variation. The motor means comprises a differential coupled to a gearbox connected to the main motor, and a corrector motor linked to the detecting means so as to drive rotationally the feeding and dispensing means at a rotational speed proportional to a rotational speed set by the gearbox and continuously corrected by the detected speed difference.

16 Claims, 5 Drawing Figures

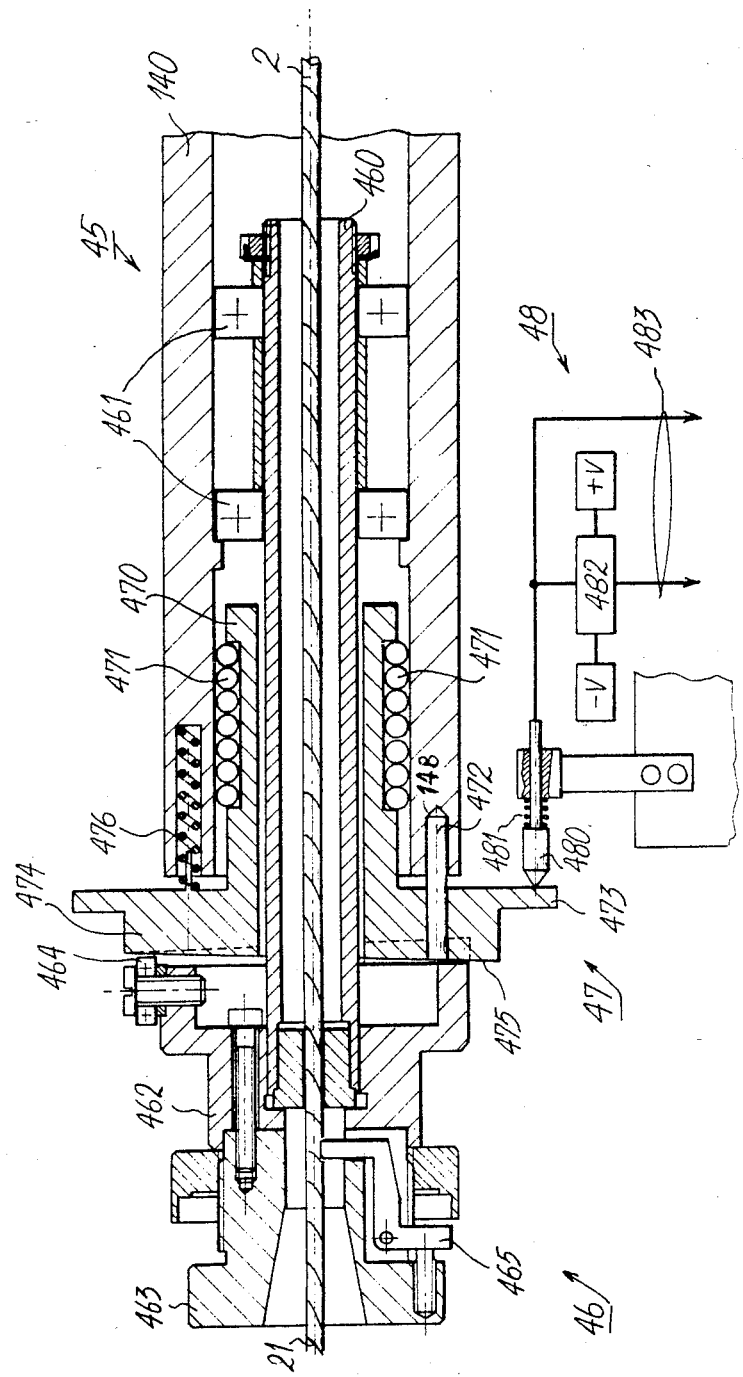

SYSTEM FOR ROTATIONALLY SLAVING AN OPTICAL FIBER FEEDING AND DISPENSING DEVICE IN A CABLING LINE

BACKGROUND OF THE INVENTION

1. Field of the Invention

The present invention relates to a rotational slaving of an optical fiber feeder device, such as a rotating holder carrying optical fiber spools, in terms of a variable pitch of helical grooves in a ring drawn through an optical fiber cabling line. The optical fibers are rotationally unwound from the spools and run through fiber-guides included in a rotating dispensing device for laying in the ring grooves. The ring then runs into a taping unit providing a protective sheathing to hold the fibers in the grooves.

More particularly, this invention deals with a system for slaving a rotational speed in optical fiber feeding means rotationally driven by first motor means to a number of helical groove pitches per second in a grooved ring drawn at a constant translational speed by second motor means along an optical fiber cabling line. The fibers fed from the feeding means are laid into the translated ring grooves through rotating fiber-dispensing means.

This slaving system is intended for accomodating fluctuations in the helical groove pitch as a result of manufacturing the ring by extrusion. If the fiber feeding means and the fiber dispensing means do not revolve around the ring with a rotational speed matching the fluctuations in groove pitch, the ring is subjected to an undesirable twist load can cause a deterioration thereof.

2. Description of the Prior Art

Known slaving systems of this type partially solving this problem are briefly described in French addition certificate application No. 2,458,086 corresponding to U.S. Pat. No. 4,309,864, and in U.K. patent application No. 2,121,209A corresponding to U.S. Pat. No. 4,497,164. In these systems, the fiber dispensing means is rotationally slaved by the rotation of the fiber feeding means. The dispensing means comprises fiber-guides respectively engaged in the ring grooves and turns precisely at a rotational speed equal to the pitch number per second of the translationally-moving ring.

In French addition certificate application No. 2,458,086, electromechanical means are provided in the form of a rider integral with fiber dispensing means and cooperating with a split conductor ring integral with the feeding means. The electromechanical means is fit to determine the relative rotational speed and the relative angular position of the dispensing means with respect to the feeding means thereby regulating a motor rotationally driving the fiber feeding means.

In U.K. patent application No. 2,121,209A, means for determining the relative speed and angular position takes the form of two thin circular plates provided with slots. The two plates are respectively integral with the feeding means and the dispensing means and run through two stationary photoelectric cells. The photoelectric cells transmit trains of electric pulses that are compared in a comparator thereby controlling the motor imparting rotational movement to the fiber feeding means.

In these slaving systems, the dispensing means are not rigidly linked to the feeding means, which again leads to submitting the unwound optical fibers to strains and tensions when the rotational speeds of these means are unequal. This relative speed inequality arises not only whenever the ring pitch varies before reaching a constant value but also when the groove run over the length of one pitch is not perfectly helical.

Further, the second motor means for drawing the ring along the cabling line are totally separate and independent of the first motor means intended for imparting rotation to the fiber feeding means. When the cabling line is set running, considerable phase shift between the apparent rotational speed of the helical grooves in the ring and the rotational speed of the feeding means occurs during a relatively long period of time until such time as the relative phase shift in speeds has fallen off. The slaving function does not exist then at low speed.

Additionally, the fiber dispensing means designed to regulate the rotational speed of the fiber feeding means are arranged downstream of the feeding means in the translation direction in which the ring runs. Rotational-speed correction in the feeding means therefore takes place with some lag compared to the fluctuations in groove pitch, thereby also causing undue strain in the fibers.

OBJECT OF THE INVENTION

The main object of the invention is to provide a slaving system as defined in the foregoing to obviate the drawbacks educed hereinabove.

SUMMARY OF THE INVENTION

Accordingly, a slaving system therein comprises means mechanically coupled partly to the ring and partly to the feeding means for continuously detecting a speed difference between the rotational speed of the optical fiber feeding means and the number of ring helical groove pitches per second thereby converting the detected speed difference into a voltage variation. The first motor means rotationally driving the feeding means comprises first input means mechanically coupled to the second motor means drawing the ring, second input means electrically coupled to the detecting means, and output means mechanically coupled to the first and second input means for rotationally driving the fiber feeding means at a rotational speed proportional to a rotational speed imposed by the second motor means and continuously corrected by the detected speed difference. Further, the fiber dispensing means are rigidly linked to the feeding means.

The above main features of the slaving system embodying the invention afford primarily the following advantages.

The mechanical link between the first and second motor means makes it possible to maintain slaving at low speed, especially during cabling line start-up. The second input means including a direct current and variable speed corrector motor controls a differential in terms of continuous pitch fluctuations and slaves the speed of the feeding means even for a relatively low ring forward speed.

In accordance with the invention, the fiber feeding means and the fiber dispensing means are rigidly linked together and turn, therefore, together at the slaved speed. The problems related to strains on the fibers between the pay-out spools and the fiber-guides are hence resolved.

The means for detecting the difference between the slaved rotational speed and the number of pitches per second are set up upstream of the fiber feeding means as the ring runs and are totally separate from the fiber dispensing means. The detecting means have an influence on the rotational speed of a follower shaft in the differential rotationally driving the fiber feeding and dispensing means, by adding a complementary speed factor dependent on the variation in groove pitch. This addition is continuous whatever the speed at which the ring is running.

In accordance with other features of the invention, the detecting means can comprise translationnaly stationary means driven in rotation by the helical grooves in the translated ring, means rotationally linked to the fiber feeding means and translatable parallel to the ring by the means driven in rotation by the helical grooves, and electromechanical means for detecting a translation in the translatable means thereby deriving the voltage variation. The detecting means preferably comprises means for measuring the voltage variation.

BRIEF DESCRIPTION OF THE DRAWING

Further advantages and features of this invention will be apparent from the following detailed description of several embodiments of this invention with reference to the corresponding accompanying drawings in which:

FIG. 5 is a schematic axial cross-section of a speed difference detecting device included in the slaving system.

DESCRIPTION OF THE PREFERRED EMBODIMENTS

Figure 1:
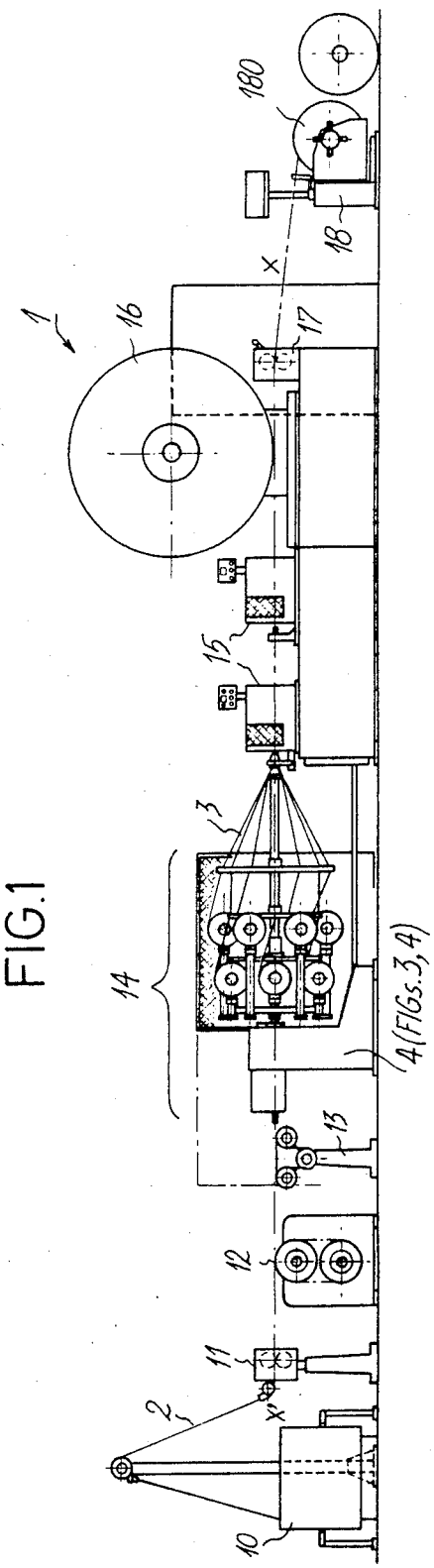
FIG. 1 is a schematic longitudinal view of a cabling line for inserting optical fibers into a translated grooved ring.
Figure 2:
FIG. 2 is a perspective view of a section of the helically-grooved ring.

With reference to FIG. 1, an optical cabling line 1 comprises upstream a pay-out stand 10 in the form of a vertical drum that pays out a grooved cylindrical ring 2 made of a thermoplastic material obtained by extrusion. In the embodiment shown in FIG. 2, the ring 2 contains a central strengthening carrier 20 that includes one steel wire or several twisted steel wires, and comprises $N=10$ parallel helical grooves 21 equally spaced out around the periphery of the ring and designed to contain at least one optical fiber 3 each. The grooves can offer a V-shaped, semi-circular, trazepoidal or square cross-section, for example. The grooves follow continuous, parallel and helical paths having a long pitch p compared to the ring diameter, typically in a ratio of approximately 10 to 60.

The ring 2 leaving the pay-out stand 10 is unrolled between tension wheels 11 and runs over a braking wheel 12. Ring 2 is linearly drawn and is subjected to a tensile load along a horizontal axis X'X longitudinal to the cabling line from the braking wheel 12 to ring drawing means, such as a drawing wheel 16 as in the illustrated embodiment or a caterpillar. Between braking wheel 12 and drawing wheel 16, ring 2 successively runs through a device 13 for measuring the tension in the ring, a rotating optical fiber feeding and dispensing device 14 offering a rotational speed $\Omega$ slaved to a translational speed v of the ring, and, more exactly, slaved to number $\Omega'=v/p$ of helical groove pitches per second, and one or more taping units 15 for enveloping the ring containing the fibers with one or more protective sheathing tapes made, for example, of terphane. The taped ring is wound several times around the drawing wheel 16 that has the form of a big disk tangential to the axis X'X and rotating about a horizontal rotation axis orthogonal with the axis X'X. Ring 2 then runs between counter-tension wheels 17 and is wound around a reel 180 in a winding device 18 at an output end of the cabling line 1.

Figure 3:
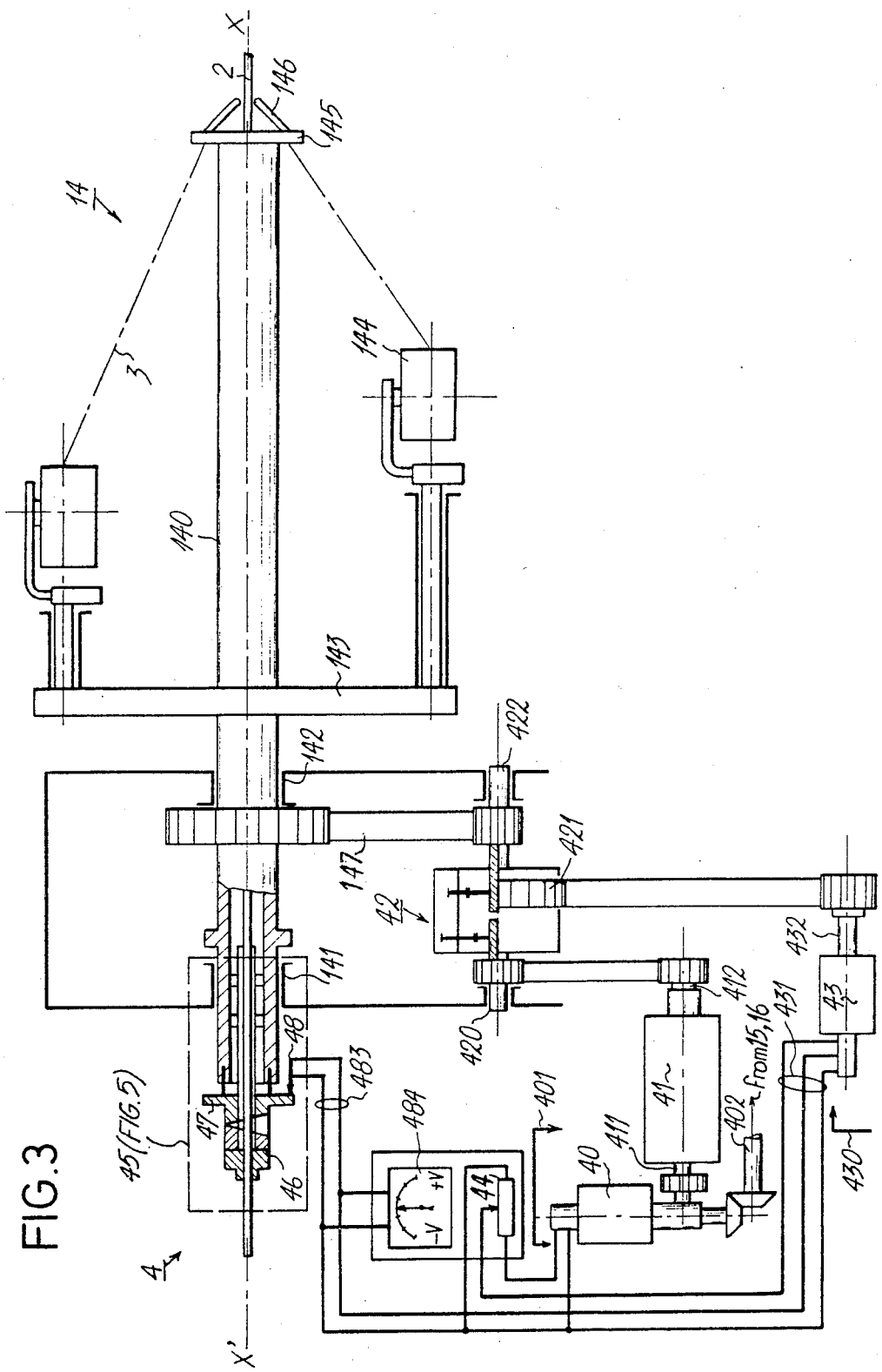
FIG. 3 is a schematic view of a system for slaving the rotational speed of a fiber feeding and dispensing device embodying the invention.

As illustrated in FIG. 3, the optical fiber feeding and dispensing device 14 comprises a tube 140 through which ring 2 runs coaxilly and freely. Tube 140 is rotably mounted in rear and front journals 141 and 142 respectively, of the double ring ball-bearing type secured in a fixed frame. A plate 143 extends orthogonally with the axis X'X and bears at least N fiber pay-out spools 144. The plate 143 and a holder 145 including N fiber-guides 146 are rigidly linked to the tube 140 in front of the journal 142 and to a front end of the tube 140 respectively. Optical fibers 3 are unwound from the spools 144 and travel through the fiber-guides 146 before being laid in the ring grooves 21. Fiber-guides 146 are arranged along the generating lines of a cone coaxial with the axis X'X and carry front ends meshing with the ring grooves respectively.

Figure 4:
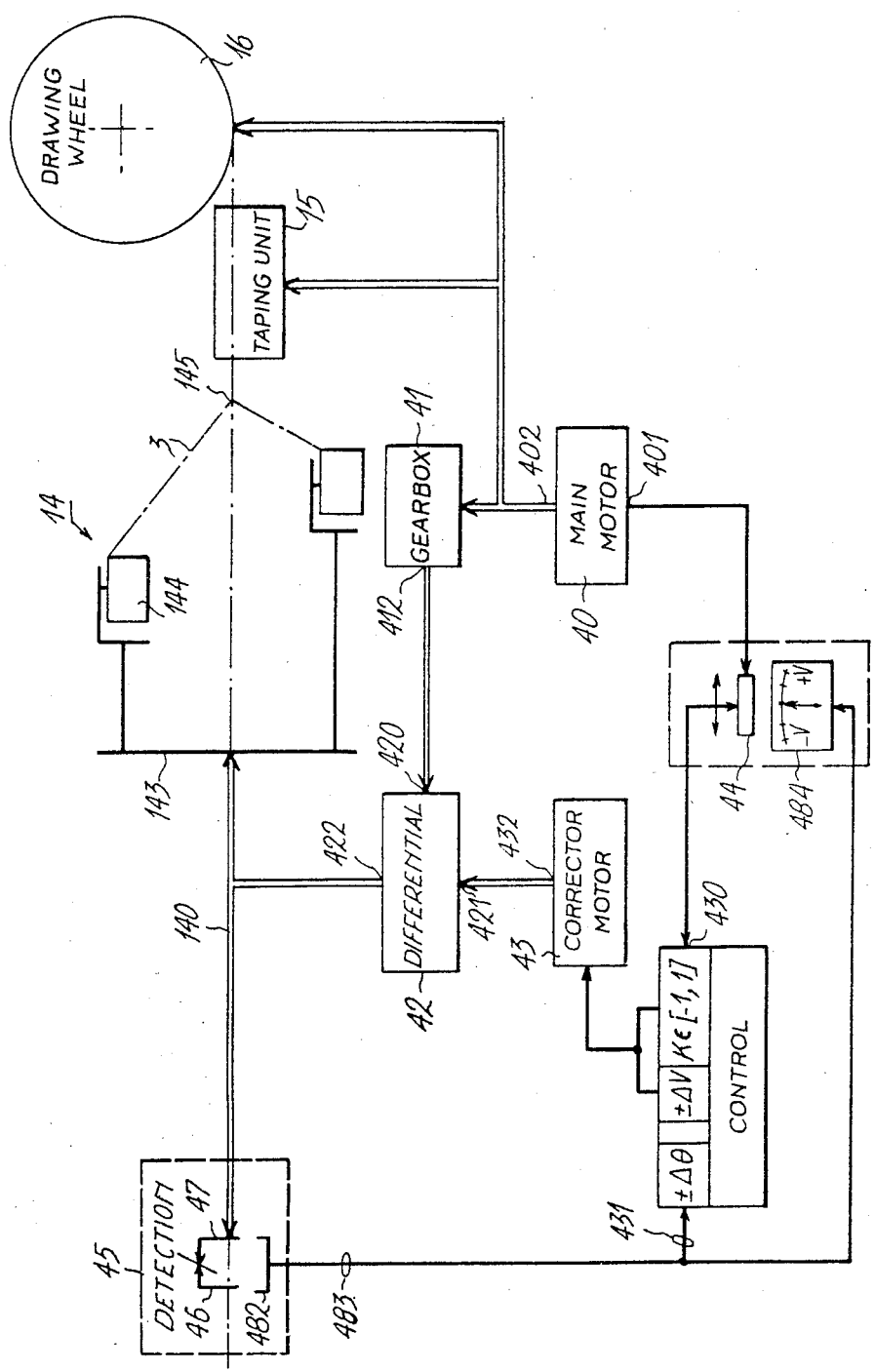
FIG. 4 is a schematic block diagram of the slaving system in which the single and double lines between various blocks denote electrical and mechanical links respectively.

A slaving system 4 embodying the invention is now described with reference to FIGS. 3 and 4.

A main direct-current motor 40 drives devices used for taping the ring in the taping units 15 and the ring drawing means such as the drawing wheel 16 by means of chain meshing and speed variators 402. In the embodiment shown, the drawing wheel 16 imparts forward translation to the ring 2 along the axis X'X at a predetermined constant speed v.

The main motor 40 further drives the fiber feeding and dispensing means 14 via a gearbox 41, having $M=6$ gear ratios for instance, and a differential 42. Differential 42 carries two inputs respectively made up of a motor shaft 420 coupled by a chain mechanism to a secondary shaft 412 in the gearbox, and a control shaft 421 coupled by a chain mechanism to a motor shaft 432 of a direct-current and variable speed corrector motor 43. The rotational speed of a follower shaft 422 in the differential 42 is equal to the rotational speed of the motor shaft 420 weighted by a fraction of the variable rotational speed of the motor shaft 432 in the corrector motor 43. Tube 140 rigidly linked to the spool plate 143 and the fiber-guide support 145 is rotationally driven by a chain mechanism 147 arranged between the journal bearings 141 and 142 and coupling the follower shaft 422 of the differential 42 to the tube 140.

The purpose of the corrector motor 43 is to modify the rotational speed $\Omega$ of the tube 140 in terms of the variation $\pm \Delta p$ in the pitch p of the helical grooves in the ring for a gear ratio given by the gearbox 41. The corrector motor carries two electrical control inputs 430 and 431.

The first input 430 is connected to an output 401 from a tachometric dynamo 401 on the main motor 40 via a potentiometer 44. The potentiometer 44 delivers a voltage proportional to a fraction K of the main motor rotational speed, where K lies between $-1$ and $+1$. A voltage on the input 430 is selected manually using the potentiometer 44 such that the rotational speed $\Omega$ of the tube 140 is exactly equal to the number of pitches per second Ω' lying between two gear ratios in the gearbox 42 within the limit of the gear ratios of intermediate meshings, for a nominal pitch regarding the grooves 21 in the ring 2. If the gearbox 42 is used alone, without the corrector motor 43, only M rings may be cabled with different pitch values proportional to the M gear ratios. By using the corrector motor 43, it becomes possible to accommodate a continuous variation in the rotation of the tube 140 thereby permitting the cabling of any ring regardless of the pitch thereof.

Second inputs 431 are connected to a device 45 for detecting difference in speed and, more generally, the variation in pitch p of the ring grooves 21 with a view to accurately slaving the rotational speed Ω of the tube 140 to the pitch number per second Ω'.

With reference to FIG. 5, the speed difference detecting device 45 is arranged at a back end of the tube 140 and axially accommodates the ring 2 running through it. Device 45 mainly consists of a first cylindrical member assembly 46 immediately surrounding the ring 2 and rotationally driven by the ring grooves, and a second cylindrical member assembly 47 partly surrounding the first assembly 46, partly enclosed by the back end of the tube 140, linked rotably to the tube 140 and translatable coaxially with the axis X'X.

The first member assembly 46 comprises a sheath 460 surrounding the ring 2 inside the tube 140 and linked in translation thereto by two ball-bearings 461. Two bushes 462 and 463 are fixed behind the tube 140 at one end of the sheath 460. The bush 462 is arranged between the sleeve 460 and the bush 463 and carries a roller 464 spinning freely about a radial axis and fit for describing a circle coaxial with ring 2. The bush 463 is arranged at a back end of the first assembly 46 and includes at least one radial finger 465 engageable in one of the grooves 21 in the ring 2. In practice, three or four fingers circularly spaced out at equal distances are provided for engagement in the corresponding grooves in the ring. Known means are provided for withdrawing the fingers 465 from the ring grooves and holding them sufficiently clear thereof to insert the ring freely along the axis X'X prior to any cabling operation. Each finger 465 has one end oriented towards the axis X'X that is tapered and offers a radial cross-section complementary the transverse section of a groove 21 in the ring.

The second member assembly 47 comprises a sleeve 470 freely enveloping a portion of the sheath 460 to the rear of the ball-bearings 461. The sleeve 470 is translationally guided by means of two ball-bearing bushes 471 inserted in the back end of the tube 140. Sleeve 470 is rotationally driven about the axis X'X by the tube 140 by means of longitudinal drive fingers 472 fixed to a rear flange 473 of the sleeve 470 and sliding in blind holes 148 made in the rear face of the tube 140. A washer forming a cam 474 is fixed to the rear of the sleeve 470 and carries a curvilinear rear surface 475 shaped as a hollow spiral of a helix having a pitch of a few millimeters, centered on the axis X'X. Sleeve 470 is permanently thrust towards the bush 462 by a longitudinal compression spring 476 lodged in the back of the tube 140 such that the roller 146 is constantly in contact with the spiraled active surface 475 of the cam 474.

It can be seen from the above description that the first assembly 46 is stationary in translation and turns about the axis X'X at the rotational speed Ω'=v/p representing the apparent rotation of the grooves in the ring 2 as a result of the fingers 465 engaged in the ring grooves 21, and that the second assembly 47 turns about the axis X'X at the rotational speed Ω of the tube 140 and is translationally moved by the roller 464 when the speeds Ω and Ω' are momentarily different as is the case when there is a pitch fluctuation in the ring grooves. The translational movement of the cam 474 is detected by electromechanical means 48 for controlling the rotational speed of the corrector motor 43. Electromechanical means 48 comprises a spindle 480 sliding in the frame parallel with the axis X'X and kept in press contact with the flange 473 of the sleeve 470 by a spring 481, as well as a voltage divider comprising a potentiometer 482 connected between two terminals raised to symmetrical and opposite tension values +V and −V with respect to a reference voltage equal to 0 volt. Spindle 480 is linked to a rider of the potentiometer 422. Output terminals 483 of the potentiometer 482 are connected to the second electrical control inputs 431 of the corrector motor 43 and to the terminals on a measuring device 484 such as a voltmeter.

As already stated, for a ring 2 with grooves 21 having a nominal pitch p, the rotational speed of the fiber feeding and dispensing device 14 is adjusted to the speed Ω'=v/p by selecting firstly a ratio in the gearbox 41 that imparts a rotational speed in device 14 nearest to Ω'. Next, when the cabling line 1 is started up, this results in a relative difference in rotational speed between the tube 140 and the first member assembly 46 thereby causing a displacement forwards or backwards of the second member assembly 47 that activates the potentiometer 482. A fluctuation in voltage is thus created across terminals 483 of potentiometer 482 and controls the corrector motor 43 via second electrical control inputs 431, which equalizes the rotational speeds of the assembly 46 and the tube 140. At this stage, the roller 464 is located at a certain position between the ends of the spiraled surface 475 of the cam 474. The roller 464 is then brought to a position mid-way between the ends of the spiraled surface 475 of the cam 474 in order to profit from a range of fluctuation in speed controlled by slaving with the same scale in the increased-speed direction as in the reduced-speed direction. To achieve this, the potentiometer 44 is manually adjusted to modify the rotational speed of the corrector motor 43 by means of the first electrical control input 430. The effect this has is to change the rotational speed of the assembly 47 and, thus, to offset the assembly 47 through a certain angle with respect to the assembly 46. This angular off-set is detected by the spindle 480 that, via potentiometer 482, controls the corrector motor 43 such that motor 43 reverts to its speed prior to the manual adjustment above. To sum up then, to modify the angular position of the assembly 47 with respect to the assembly 46, the condition of the potentiometer 44 must be modified.

During cabling, if the groove pitch varies by ±Δp, the rotational speed Ω' of the first assembly 46 varies by ±ΔΩ' and the cam 474 is translationally displaced forwards or backwards, thereby inducing a voltage variation ΔV in the control voltage of the corrector motor 43. The speed variation in the motor 43 is converted into a speed variation in the driven shaft 422 of the differential 42 in the same proportions, thus again equalizing the speeds Ω and Ω'.

What we claim is:

1. A system for slaving a rotational speed of optical fiber feeding means rotationally driven by first motor means to a number of helical groove pitches per second in a grooved ring drawn at a constant translational speed by second motor means along an optical fiber cabling line, said optical fibers fed from said feeding means being laid into said ring grooves through rotating fiber-dispensing means, said system comprising means mechanically coupled partly to said ring and partly to said feeding means for continuously detecting a speed difference between said rotational speed and said number of pitches per second thereby converting said detected speed difference into a voltage variation, said first motor means comprising first input means mechanically coupled to said second motor means, second input means electrically coupled to said detecting means, and output means mechanically coupled to said first and second input means for rotationally driving said fiber feeding means at a rotational speed proportional to a rotational speed imposed by said second motor means and continuously corrected by the said detecting speed difference, and said fiber-dispensing means being rigidly linked to said fiber feeding means.

2. The system claimed in claim 1 wherein said output means and said first and second input means in said first motor means comprise respectively a differential, a gearbox mechanically coupling said second motor means and a motor shaft of said differential, and a direct current and variable speed corrector motor controlled by said voltage variation and controlling said differential, a follower shaft of said differential rotationally driving said fiber feeding means and said fiber dispensing means.

3. The system claimed in claim 2 wherein said first motor means comprise means including a potentiometer connected to a tachometric output of said second motor means for adjusting said speed of said corrector motor such that said fiber feeding means and said fiber dispensing means turn at a rotational speed lying between two gear ratios of said gearbox, within the limits of intermediate meshing ratios, for a nominal ring groove pitch.

4. The system claimed in claim 1 wherein said detecting means comprises translationally stationary means rotationally driven by said helical grooves of said translated ring, means rotationally linked to said fiber feeding means and translatable parallel to said ring by said means rotationally driven by said helical grooves, and electromechanical means for detecting a translation of said translatable means thereby deriving said voltage variation.

5. The system claimed in claim 4 wherein said detecting means comprises means for measuring said voltage variation.

6. The system claimed in claim 4 wherein said means rotationally driven by said helical grooves and said translatable means comprise respectively a roller fit for describing a circle coaxial with said ring, and a cam having an active surface inclined with respect to said ring, and said fiber feeding means includes spring means for permanently applying said active cam surface against said roller.

7. The system claimed in claim 6 wherein said active surface of said cam is the shaped as a helical spiral coaxial with said ring.

8. The system claimed in claim 6 wherein said active surface of said cam is shaped as a helical spiral coaxial with said ring.

9. The system claimed in claim 8 wherein said rotationally driven means comprises at least one retractable finger engaged in a groove of said ring.

10. The system claimed in claim 4 wherein said fiber feeding means includes a tube coaxial with said ring and rigidly linked to said fiber-dispensing means, said means rotationally driven by said helical grooves comprises a sheath surrounding said ring and guided rotationally inside said tube, and said translatable means comprises a sleeve freely enveloping said sheath and guided translationally inside said tube.

11. The system claimed in claim 4 wherein said means rotationally driven by said helical grooves comprises at least one finger engaged in a groove of said ring.

12. The system claimed in claim 4 wherein said electromechanical means comprises voltage dividing means including a potentiometer raised between two opposite voltages and adjustable by said translatable means.

13. The system claimed in claim 1 wherein said detecting means and said fiber-dispensing means are arranged respectively at upstream and downstream ends of a tube coaxial with said ring with respect to the ring translation direction, said tube carrying said fiber feeding means.

14. The system claimed in claim 1 wherein said second motor means are coupled mechanically to means for taping said ring containing said optical fibers dispensed from said fiber-dispensing means.

15. In an optical fiber cabling line where a ring having parallel helical grooves is drawn at a constant translational speed by a main motor, a system for slaving a rotational speed of optical fiber feeding and dispensing means rotationally driven by motor means to a number of translated ring groove pitches per second, said optical fibers fed from said feeding and dispensing means being dispensed into said grooves in said translated ring.

said system comprising translationally stationary means rotationally driven by said helical grooves of said translated ring, means rotationally linked to said fiber feeding and dispensing means and translatable parallel to said ring by said rotationally driven means in response to a speed difference between said rotational speed and said number of pitches per second, and electromechanical means for detecting a translation of said translatable means thereby converting said speed difference into a voltage variation, and said motor means comprising a gearbox mechanically coupled to said main motor, a direct current and variable speed corrector motor controlled by said voltage variation, and a differential mechanically coupled to said gearbox and corrector motor for rotationally driving said fiber feeding and dispensing means at a rotational speed proportional to a rotational speed imposed by said gearbox and continuously corrected by said corrector motor in function of said speed difference.

16. The system claimed in claim 15 wherein said fiber feeding and dispensing means includes a tube coaxial with said ring and comprising a spring means parallel to said ring, said rotationally driven means comprises a sheath surrounding said ring and guided rotationally inside said tube and a roller mounted on said sheath and fit for describing a circle coaxial with said ring, and said translatable means comprises a sleeve freely eneloping said sheath and guided translationally inside said tube and a cam secured to said sleeve and having an active surface inclined with respect to said ring and permanently applied against said roller by said spring means.

* * * * *